United States Patent [19]

Randolph

[11] 4,155,774

[45] May 22, 1979

[54] PROCESS FOR CONTROLLING THE RATE OF GROWTH OF PARTICULATE MASSES

[76] Inventor: Ellwood A. Randolph, 680 Sharp La., Baton Rouge, La. 70815

[21] Appl. No.: 823,082

[22] Filed: Aug. 9, 1977

[51] Int. Cl.$^2$ .......................... C13G 1/06; C13F 1/02
[52] U.S. Cl. ................................ 127/60; 23/230 A; 23/301; 127/15; 127/16; 127/58; 127/62; 159/44; 159/45; 356/73; 364/500; 422/245; 422/111
[58] Field of Search ...................... 127/15, 16, 60, 61, 127/62; 23/230 A; 364/500

[56] References Cited

U.S. PATENT DOCUMENTS

| | | | |
|---|---|---|---|
| 3,220,883 | 11/1965 | Howard | 127/61 X |
| 3,503,803 | 3/1970 | Bennett | 127/61 X |
| 3,681,025 | 8/1972 | Dalgaard | 23/230 A X |
| 3,694,158 | 9/1972 | Laver | 23/230 A X |
| 3,725,127 | 4/1973 | Retali | 23/230 A X |
| 3,899,386 | 8/1975 | Komiyama | 127/60 X |
| 3,981,739 | 9/1976 | Dmitrovsky | 127/60 |
| 4,009,045 | 2/1977 | Petri | 23/230 A X |
| 4,016,001 | 4/1977 | Hoks | 127/61 X |

OTHER PUBLICATIONS

Spencer-Meade "Cane Sugar Handbook", 9th Edition, 180-188, John Wiley & Sons, New York, 1963.
"Beet-Sugar Technology", R. A. McGinnis, ed., 2nd Edition, 682-683, Beet Sugar Devel. Found., Fort Collins, 1971.

Primary Examiner—Sidney Marantz
Attorney, Agent, or Firm—Llewellyn A. Proctor

[57] ABSTRACT

A vacuum pan is controlled by directly monitoring the total solids concentration of a boiling solution. A preferred type of process relates the change in concentration of sugar in a massecuite to the growth rate and increase in the number of crystals, and uses this relationship to control the rate of growth of the crystals by setting temperature and pressure to correspond to the rate of crystal growth desired. Water is evaporated from the pan solution at reduced temperature and pressure. Massecuite is withdrawn from the pan, and split into two streams: (1) a first stream wherein the mother liquor is separated from the sugar crystals and analyzed to determine the total sucrose content of the stream, and (2) a second stream which is analyzed to determine the count and size of the crystals. The sum-total of the two streams is used to determine the total concentration of sugar. Readings taken over definite intervals determine the rate of growth of the crystals.

11 Claims, 1 Drawing Figure

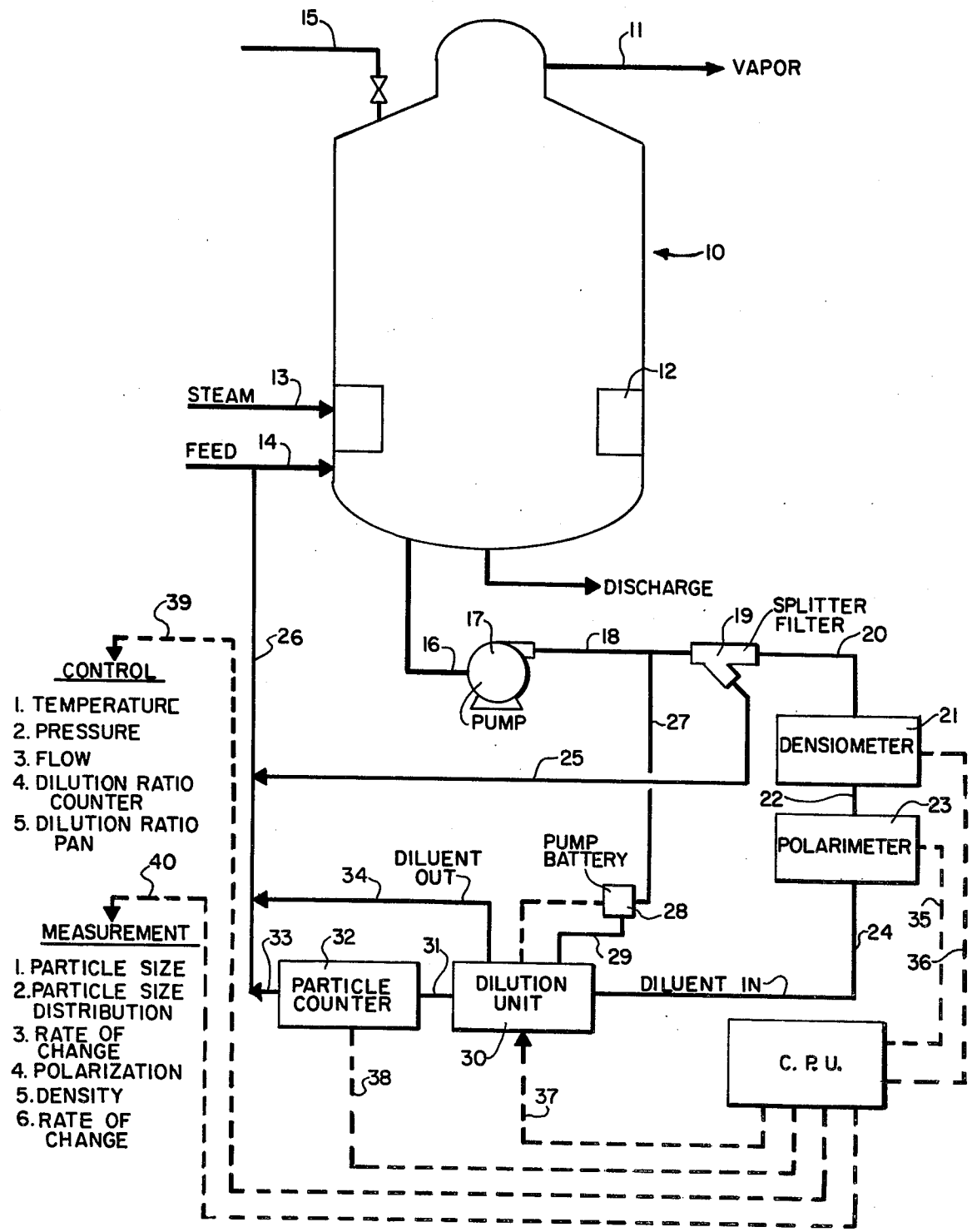

PROCESS FOR CONTROLLING THE RATE OF GROWTH OF PARTICULATE MASSES

Various biological and chemical systems are known wherein particles of mass are formed, and grown at various rates from small and infinitesimal sizes to larger sizes. For example, it is known that microorganisms "grow" at an exponential rate, and that the rate of growth is related to the amount of nutrient fed to a culture, and to the quantity of microorganisms contained therein. On the one hand, if an insufficient amount of nutrient is fed into the process the organisms do not grow. On the other hand, if too much nutrient is fed a different and usually a higher growth rate is obtained unless repressible enzymes are produced. Thus, it is necessary to control the nutrient rate to a culture in accordance with the growth or multiplication rate. In industrial applications, also, various particulate non-living materials are formed and grown, whether or not the structure is highly organized (i.e., crystalline) or amorphous. As regards the former, however, crystallization is of profound importance because of the great variety of materials that are marketed in crystalline form, e.g., silicone crystals for use as semiconductors, electrolytic alumina produced from bauxite, sodium carbonate, potassium sulfate, cupric sulfate and the like. In all such processes the rate at which the particulate masses are formed are of profound importance, and their rate of growth must be controlled. The production of sugar, or sucrose, is illustrative of such processes.

Sugar, or sucrose, a disaccharide which has the formula $C_{12}H_{22}O_{11}$, is produced commercially from sugar beets and sugar cane. In the production processes, sliced beets are extracted with water to recover sugar via membrane diffusion; and sugar is recovered from cane by crushing and grinding the cane to rupture the plant cells and cause the release of sugar-bearing juice. The beet diffusion juice, or can juice, is clarified and the dilute sugar-bearing solution is then sent to multiple-effect evaporators to produce a syrup containing about 60 percent solids. Further concentration, crystallization, precipitation and recovery of the raw sugar is commonly conducted in a single-effect vacuum pan.

Vacuum pans are usually vertical, generally cylindrical shaped vessels equipped with heating elements such as steam coils, or chests containing vertical tubes known as calandrias. The syrup from the evaporators is introduced into the vacuum pan, and steam is introduced into the coils or calandrias to boil the syrup, or massecuite, and water removed for further concentration of the sugar. Initially, a charge of the syrup from the evaporators is taken into the vacuum pan and boiled until the liquor is supersaturated. At this point in time, some sugar nuclei are permitted to form spontaneously; or a foot from a previous boiling is left within the pan to provide the desired sugar nuclei; or sugar seed crystals are added to provide the desired sugar nuclei. In any event, subsequent operation is maintained within the supersaturation zone, or metastable zone as fresh charges of syrup from the evaporators are added, at which condition the crystals are of a size that any tendency to redissolve in the less saturated feed to the pan is avoided, or suppressed. The fresh charges of sugar added to the pan permit growth and promotion of crystallization, the nuclei obtaining therefrom the sucrose required for growth. Over-nucleization, or false graining, however, is to be avoided, for this would result in improper crystal growth.

It is desirable to concentrate a maximum of sugar solids within the vacuum pan, and within as short a period of time as possible. It is also desirable that the sugar be of fairly large and uniformly sized grain, and to achieve these ends it is necessary to boil the supersaturated sugar solution in the pan at conditions which are carefully controlled by a highly experienced person known in the industry as a sugar boiler, or pan man. The sugar boiler takes into the vacuum pan a quantity of syrup or molasses which he knows from experience will produce the amount of crystal nuclei which, at full growth, will be the proper size for commercial raw sugar and which, when such size is reached, will result in a full pan of massecuite. By the use of a proofstick he withdraws samples which he visually inspects for graining, or for determining the presence of minute crystals of sucrose. Based on the feel of the syrup between his fingers, by stretching to determine tackiness, by the odor and color of the syrup the sugar boiler manipulates pan temperature, vacuum level, rate of heating, and rate of introduction of the charges of syrup. The sugar boiler continues throughout the boiling period to check the development of crystal growth by inspection of proofstick samples. The efficiency of the vacuum pan is thus directly related to the skill and experience of a single individual, the sugar boiler. If the sugar boiler does his job in the most efficient manner possible, he keeps the crystals growing until, at the moment that the pan is struck, or the contents discharged, the pan contains a dense mixture of sugar and molasses. Ideally, the total sugar solids content of the pan at completion of the boil is as high as possible and the crystals are of large, uniform size. Typically, e.g., the masecuite at the time the pan is struck contains about one-half of the solids in the form of crystals, and about one-half of the solids in solution. The massecuite, on discharge, is fed into crystallizers where crystallization is further continued, or fed into mixers from which it is directed to centrifuges. If the strike was made at the right time, the crystals are sufficiently large, and generally of fairly uniform size. However, manual operation of this kind can result in significant differences between the batches of massecuite produced at different periods, thus creating process difficulties in the further processing of the sugar.

Some effort has been made to eliminate this source of human error, and attempts have been made to measure and control process variables other than temperature, pressure, and liquid level which, at present, are commonly controlled. For example, conductivity methods have been employed, refractive indicies have been taken, and viscosity measurements have been made of the boiling syrup in efforts to determine the sugar content of the syrup. Boiling point methods and differential techniques have also been employed in efforts to determine the precise moment in time when the pan should be struck. The problem, however long recognized, yet persists and has not yet been resolved.

It is, accordingly, the primary objective of the present invention to obviate this and related prior art problems associated with the growth of particulate masses, biological and chemical.

In particular, it is an object to provide a solution which not only will determine with precision the exact moment when the pan should be struck, but also provide greater operating efficiency by permitting operation at very highly supersaturated levels; levels very near and just below the false graining zone, or region.

A specific object is to provide a new and novel process wherein the concentration of the sugar in the syrup of the vacuum pan is directly measured in terms of the number of particles and particle size per unit volume, and related with the temperature and pressure of the pan.

A further and more specific object is to provide such process wherein, in the direct determination of sugar concentration, the actual particle size and particle count are directly made and these measurements used in maintaining and controlling the production and growth of sugar crystals throughout the period of crystal growth, up to the time that the pan is struck.

These objects and others are achieved in accordance with the present invention, characterized generally as a process for controlling the growth rate of particulate masses, biological or chemical, crystalline or non-crystalline, but preferably crystalline materials, especially for the operation of a vacuum pan wherein the concentration of the sugar in the syrup, or massecuite, within the pan is directly determined, and controlled, throughout the period of operation of the pan, and this variable, in turn, is directly interrelated with pan temperature and pressure which is also measured, and controlled, so that fresh feed can be added in measured increments to sustain the desired growth rate of the sucrose crystals in direct relation to the rate of water being evaporated and removed from the pan during the operation.

Initially, in accordance with the practice of this invention, there is formed, or established, within the vacuum pan a supersaturated solution of sugar, or aqueous solution, containing nuclei of sucrose crystals, and charges of feed comprising a dilute aqueous sugar solution, or syrup, as obtained from multiple-effect evaporators, are fed into the vacuum pan and water evaporated therefrom at reduced pressure and temperature. A portion of the syrup, or massecuite, that is contained in the vacuum pan is withdrawn, continuously or intermittently, and determination is made of the sugar concentration in the syrup, or massecuite, by direct count of the number of sucrose crystals per unit volume, direct determination of sucrose crystal size and size distribution, and direct measurement of the amount of sugar contained in the solution. The total sugar concentration of the syrup, or massecuite, at any given point in time is directly interrelated with the temperature and pressure which is also measured, and controlled, these factors determining the rate of evaporation of water from the pan; and fresh charges of feed are added in direct relation to the rate of evaporation of water from the pan.

In the best mode of practicing the inventive process, the vacuum pan is maintained at the maximum practical controllable vacuum which, in effect, regulates the temperature which generally is not directly controlled, temperature being a function of pressure, sugar concentration and purity of the syrup. This maximizes the rate of evaporation of water from the pan, and consequently the rate of concentration of sugar within the syrup, or massecuite, and minimizes the possibility of burning, or carmelizing, the sugar. In a practical operation, as commercially practiced, this control is established by regulating the amount of cooling water flowing to the barometric condenser.

It is essential in the practice of this invention to operate the pan at conditions which maintain the syrup, or massecuite, in a state of supersaturation, and preferably the syrup, or massecuite, is maintained in a state very close to the false graining region to maximize the rate of growth of crystals until, at the moment the pan is struck, the pan contains a dense mixture of molasses and sugar, the latter of large, uniform size. Supersaturation, a variable related to the temperature and concentration of total sugar, is directly controlled and, in accordance with this invention, is the variable primarily subjected to measurement and control.

The characteristics of the present process, and its principle of operation, will be more fully understood by reference to the following detailed description, and to the figure to which reference is made in the subsequent description.

Referring to the figure, there is schematically depicted a conventional calandria vacuum pan 10 provided with the usual vapor outlet 11, steam coils, or calandrias, 12 into which steam is injected via inlet 13 to boil the syrup, or massecuite, while vapor is removed from said vapor outlet 11. The vacuum can be maintained by condensation of the vapors in a barometric condenser, leg pipe or Torricellian condenser (not shown), and a vacuum pump (not shown) is usually provided to remove noncondensable gases such as enter through leaks in the pan, or with the syrup feed which enters via inlet 14. Vacuum can be controlled by leaking air into the vacuum line 15, the temperature being permitted to seek its own level depending upon the applied vacuum, and the concentration and purity of the syrup, or massecuite, during the particular period of the operation. If desired, however, the temperature can be controlled by regulating the temperature of the steam, or rate of flow of steam into the calandrias 12.

In initiating the operation, a melandura, or thick mill syrup, containing over about 60 percent solids, obtained by treating a screened and clarified juice in a multiple-effect evaporator (not shown), is introduced into the vacuum pan 10 via feed line 14, powdered sugar of particle size having a linear dimension about one-third that of the linear dimension of the final particle size, or size at the time the pan is struck (e.g., about 1200 microns), having been added to the syrup to provide the desired number of nucleation sites. The syrup is then boiled at a desired temperature and pressure, steam being introduced into the calandrias 12 via line 13, water being evaporated and removed from the pan 10 via line 11 until the syrup is supersaturated, at which time growth of the crystals is possible.

The primary control system of this invention, now to be described, is designed to measure and control the amount of supersaturation within the syrup, or massecuite, which is being processed, the amount of supersaturation being a function of the temperature of the syrup, or massecuite, and solids concentration, the latter being a function of pressure, sucrose concentration and purity. To measure this primary variable, a sample or specimen of the syrup is intermittently or continuously withdrawn via line 16 from the pan 10 via use of a pumping device, suitably a pump 17, and split into two separate streams, (1) a first stream for use in determining the total solids content of the stream, and (2) a second stream for use in determining the number and particle size distribution of crystals in a given volume of the syrup, or massecuite.

The first stream, which is of similar composition to the liquid within the pan, is passed via line 18 through a liquids solids separation device, e.g., a centrifuge, filter or strainer 19 wherein a mother liquor is separated from the crystals, and the sugar content of the mother liquor is determined, suitably by a polarimeter (or saccharimeter) 21, an optical analyzer wherein as monochromatic beam of polarized light is rotated by a solution in known relationship to the amount of a solute contained therein, e.g., sucrose, which is dextrorotary, so that the percentage sucrose can be directly read. Reference is made to F. J. Bates, et al, Polarimetry, Sacchiometry, and the Sugars, National Bureau of Standards Circular C440 (1942); George W. Wheland, Advanced Organic Chemistry, 2d Ed., pp. 130 ff (1949); and Galen W. Ewing, Instrumental Methods of Chemical Analysis, 2d Ed., pp. 151 ff (1960), herewith incorporated by reference.

The mother liquor, however, invariably contains materials other than sucrose as impurities. For greater accuracy in determining the amount of sucrose in said first stream, therefore, it is preferred to determine the total solids content of said first solution, or mother liquor, and compare this with the polarimeter reading, the difference in the readings indicating the amount of impurities. Thus, e.g., it is known that some invert sugar is contained in the mother liquor, or solution, and that such sugar will rotate the plane of polarized light in a direction opposite that produced by sucrose, and cause a lower reading. Consequently, a determination of total solids will provide a correction factor, or adjustment factor, for non-sucrose solids, so that the exact amount of sucrose in the stream can be more accurately determined. Accordingly, the first stream is initially passed via line 20 through a densitometer 21 and a determination of the total solids content of the solution is made, and then via line 22 to the polarimeter 23 wherein the percent sucrose in the solution is read, and correction then made to determine the exact percent sucrose contained in the solution. The sucrose content thus determined, taken in connection with the temperature of the pan liquid, or massecuite, provides a direct reading of the amount of supersaturation. The crystals separated at strainer 19 are passed via lines 25,26 to line 14, or preferably a holding tank (not shown), and reblended with the feed.

The number of sucrose crystals per unit volume, and the size of the crystals contained in the pan liquid must also be determined. Suitably, the number of crystals contained within the stream can be directly counted, and the size of the crystals directly measured, but generally this requires dilution of the liquid with a known volume of inert liquid since the concentration of the crystals is usually too great to make a direct count, particularly near the end of the cycle when the concentration of crystals is very great. Accordingly, the second stream, which is representative of a second undisturbed specimen obtained directly from the pan liquid and of similar composition, is withdrawn via lines 18,27 from the pan 10 by the pump 17 by action of a pump 28 and passed via line 29 through a dilution device 30 wherein this stream is blended, admixed, or diluted with a predetermined amount of the mother liquor, or liquid comprising said first stream, passed via line 24 to the dilution device 30. The diluted admixture of sucrose crystals and saturated sucrose solution is then passed via line 31 to a particle counter 32.

A suitable and preferred sample dilution device 30 for purposes of the present invention is that disclosed in U.S. Pat. No. 4,015,626 to Ellwood A. Randolph which was issed on Apr. 5, 1977. The device therein described, and herewith incorporated by reference, is characterized generally as apparatus useful for the staged, controlled dilution of a dense solids-containing solution. Suitably, the dense solids-containing solution (e.g., supersaturated liquid from the pan) is diluted with a preselected amount of a fluid diluent, e.g., mother liquor from which the sugar crystals have been removed. The apparatus consists of a plurality of vessels connected together in series such that diluent introduced into the first vessel of the series flows consecutively from vessel to vessel, to exit from the last vessel of the series. The raw sample of particulate solids is introduced into the last vessel of the series, diluted, and progressively diluted specimens of the original sample are transferred from vessel to vessel countercurrent to the flow of diluent. The sample, diluted with a predetermined quantity of diluent in the several stages of dilution, is finally removed from the first vessel of the series, suitable for analysis as in a visual or electronic particle counter, e.g., one produced by Royco Instrument Company, i.e., Model 345/518 with modified sensor. The output streams from the particle counter 32, and dilution device 30, are manifolded via lines 33,34, respectively, with the liquid in line 26 and recycled to a holdup tank (not shown), or reblended with the feed in line 14 and reintroduced into vacuum pan 10.

The present process is thus one wherein a desired concentration of sucrose seed particles of preselected size can be formed, or fed into the supersaturated syrup, or massecuite, of the vacuum pan, charges of feed can be added to sustain the growth of the particles, and the concentration of the sugar within the syrup, or massecuite, at any given moment in time can be readily determined by direct measurements to determine the sugar content of the syrup, or massecuite, and direct measurement to determine the number and size of the sugar crystals. Direct measurement of sugar concentration permits ready adjustment of pressure, or temperature, or both, to grow the crystals at high rates, and as near the false graining region as may be desired. On the one hand, increased nucleation as occurs within the false graining region is readily detected by the counter; and, on the other hand, it becomes a fairly simple matter to determine the concentration needed to use the total pan volume to its maximum extent.

A micro-computer, or central processing unit, CPU, suitably a Motorola 6800 or Intel 8080 Microprocessor unit, derives input data from the particle counter 32 via lead 38, from the polarimeter 23 via lead 35 and from the densiometer 21 via lead 36. Measurements of particle size and particle size distribution are taken, or read by the central processing unit, CPU, over finite intervals of time and translated into a reading of the rate of change of the particle size and particle size distribution. Similarly, the polarity and density are read and thus, too, translated into a reading of the rate of change of these variables. These rates of change are then translated into signals which control various process variables, such as temperature, pressure, feed rate, evaporation rate (which can be indirectly controlled by the rate of introduction and temperature of the steam, pressure, or combination of such variables), and the like. In particular, however, since temperature, pressure and concentration are all interrelated, it is preferred to control the rate of crystallization by adjustment of the temperature or pressure, or both; and, of these variables, it is convenient in most vacuum pan operations to control the temperature by increasing the amount of cooling water supplied to the barometric condenser while the pressure is maintained substantially constant.

In the practice of this invention, over any given finite period of time, the total concentration of the growing crystals, or particles, can be measured by the central processing unit which receives, on the one hand, inputs from the densiometer and polarimeter and, on the other hand, inputs from the particle counter in terms of particle size, and particle size distribution. These inputs are computed over definite timed intervals in terms of rates of change. These rates of change are readily translated into the precisely desired rates of change by outputs from the computer which adjusts one or more process variables, e.g., temperature and pressure, to slow down or speed up the rate of growth of the crystals, or particles.

In terms of total concentration one can thus visualize a reading at a given moment in time in terms of (a) sucrose concentration (corrected, suitably) and (b) a bell shaped curve drawn in terms of particle size distribution, and a later discrete moment in time where sucrose concentration has increased, and the mean diameter of the particles have grown. If this rate of change is that desired, the computer output makes adjustments to maintain this rate of change. If the rate falls below that desired (i.e., a preselected set point), the computer makes adjustments of one or more of the process variables, e.g., temperature and pressure, to speed up the rate of increase in total concentration, inclusive particularly the rate of growth of the crystals. If, on the other hand, the rate is faster than desired, the computer makes adjustments of the process variables sufficient to slow down the rate of increase in total concentration, and rate of growth of the crystals. One can thus visualize the particle size distribution of the crystals within a pan as being retained within a discrete range of particle sizes, i.e., within a narrow band which is a measure of uniformity of crystal size, and the mean particle size diameters as gradually increasing in size until such time as the pan is struck.

It is apparent that the process of this invention is suitable for controlling the rate of growth of various particulate substances, living or non-living, crystalline or non-crystalline; albeit the process is particularly suitable for maintaining and controlling the rate of growth of crystalline substances. It is also apparent that the invention is readily susceptible to a number of changes and variations without departing its spirit and scope.

Having described the invention, what is claimed is:

1. A process for controlling the rate of growth of a particulate mass within a zone which contains a liquid medium within which is charged a material suitable for sustaining, and increasing the rate of growth of said particulate mass comprising withdrawing liquid from said zone, and splitting same into two separate streams for determining the total concentration of particulates therein,
   (a) a first stream wherein the liquid is separated from the particulates and directly analyzed to determine the amount of solids contained therein,
   (b) a second stream wherein the size of the particulates is measured, and determination made of the number of particles contained in a unit of volume of the liquid,
   and having directly determined the rate of change in the total concentration of particulates within the liquid,
   controlling other process variables to establish the desired rate of change of total particulate concentration, and then
   discharging the contents from the zone when said zone contains the desired amount of particulates.

2. In a process for the operation of a vacuum pan by controlling the rate of growth of sucrose crystals in a supersaturated syrup, or massecuite, containing nuclei or granules of sucrose crystals, wherein charges of syrup are fed into the vacuum pan and water evaporated therefrom at reduced temperature and pressure, the improvement comprising withdrawing syrup, or massecuite, from the vacuum pan, and splitting same into two separate streams for determining the total concentration of sucrose within the syrup, or massecuite,
   (a) a first stream wherein the mother liquor is separated from the sucrose crystals and directly analyzed to determine the amount of sucrose dissolved therein,
   (b) a second stream wherein the size of the crystals of sucrose is measured, and determination made of the number of crystals contained in a unit of volume of the syrup, or massecuite,
   and having directly determined the rate of change in the total concentration of sucrose within the syrup, or massecuite,
   controlling temperature or pressure, or both, to establish the desired rate of change of total sucrose concentration, and then
   discharging the contents of the pan when the pan has been filled with massecuite.

3. The process of claim 2 wherein the syrup, or massecuite, is withdrawn from the vacuum pan and split into two separate streams for analysis of the total sucrose concentration,
   (a) a first stream wherein the mother liquor is separated from the sucrose crystals and directly analyzed to determine the amount of sucrose dissolved therein,
   (b) a second stream wherein the size of the crystals of sucrose is measured, and determination made of the number of crystals contained in a unit of volume of the syrup, or massecuite.

4. The process of claim 3 wherein, in the analysis of said first stream, the concentration of sucrose contained in the mother liquor is determined by use of a polarimeter.

5. The process of claim 3 wherein, in the analysis of said first stream, the concentration of sucrose contained in the mother liquor is determined by use of a polarimeter, and the polarimeter reading is corrected for error caused by impurities in the syrup, or massecuite.

6. The process of claim 5 wherein, in the analysis of said first stream, the amount of impurities in the mother liquor is determined by means of a densitometer, the polarimeter reading being taken in connection with said densiometer reading to make the determination feasible.

7. The process of claim 6 wherein the polarimeter and densitometer are connected in series.

8. The process of claim 3 wherein, in the analysis of said second stream, an electronic counter is used to measure the number of crystals of sucrose per unit volume, and to measure sucrose crystal size.

9. The process of claim 8 wherein, in the analysis of said second stream, the second stream is diluted with mother liquor from said first stream in known amount in the determination of sucrose crystal count.

10. The process of claim 3 wherein, in the analysis of said second stream, an electronic counter is used to measure the number and size of the sucrose crystals, the liquid fed into the electronic counter for analysis having been diluted in predetermined known concentration in a dilution device.

11. In a process for the operation of a vacuum pan by controlling the rate of growth of sucrose crystals in a supersaturated syrup, or massecuite, containing nuclei or granules of sucrose crystals, wherein charges of syrup are fed into the vacuum pan and water evaporated therefrom at reduced temperature and pressure, the improvement comprising withdrawing syrup, or massecuite, from the vacuum pan and splitting the withdrawn syrup, or massecuite, into two separate streams for analysis of the total sucrose concentration contained in said syrup, or massecuite, (i) a first stream wherein the mother liquor is separated from the sucrose crystals and directly analyzed via use of both a polarimeter and densitometer to determine the amount of sucrose dissolved therein, (ii) a second stream which is directly analyzed via use of a counter to determine the number of sucrose crystals contained in a unit of volume of the syrup, or massecuite, and the size of the sucrose crystals, and having determined the total concentration of sucrose in said syrup, or massecuite, relating the total concentration of sucrose in said syrup, or massecuite, to set the temperature or pressure, or both, to obtain with consistency a full pan of sucrose at the time the pan is struck.

* * * * *